April 28, 1953   L. A. BURROWS ET AL   2,636,899
OXIDATION PROCESS FOR PREPARATION OF TEREPHTHALIC ACID
Filed Jan. 29, 1951
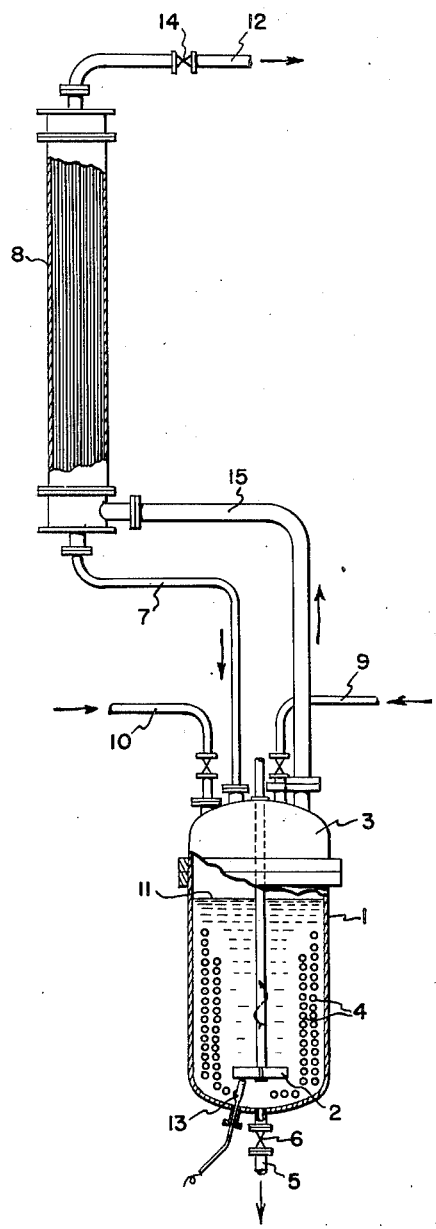
INVENTORS:
L. A. BURROWS,
R. M. CAVANAUGH,
and W. M. NAGLE.
BY
ATTORNEYS Patented Apr. 28, 1953

2,636,899

UNITED STATES PATENT OFFICE 2,636,899

OXIDATION PROCESS FOR PREPARATION OF TEREPHTHALIC ACID

Lawton Arthur Burrows, Mendenhall, Pa., and Robert Morris Cavanaugh and Wesley Michael Nagle, Woodbury, N. J., assignors to E. I. du Pont de Nemours & Company, Wilmington, Del., a corporation of Delaware Application January 29, 1951, Serial No. 208,354

5 Claims. (Cl. 260—524)

This invention relates to a process for the manufacture of terephthalic acid by the oxidation by means of nitric acid of a p-dialkylbenzene and more particularly to such a method in which high operating efficiency results.

This is a continuation-in-part of our co-pending application, Serial No. 52,502, filed October 2, 1948.

It is known that oxidation products may be obtained by the reaction of p-xylene and nitric acid, and the methods of the prior art have found the predominant oxidation product to comprise p-toluic acid. When terephthalic acid has been desired as the final product in substantial amounts, it has been necessary to oxidize the p-toluic acid further by other methods.

An object of the present invention is a one-step process for the production of terephthalic acid by the oxidative effect of nitric acid on a p-dialkylbenzene. A further object is such a process in which high yields of terephthalic acid are obtained and the oxidized product consists mainly of this acid. A still further object is such a process for the oxidation of p-xylene, characterized by greatly simplified procedure and increased efficiency, particularly with respect to short times of reaction. Additional objects will be disclosed as the invention is described more at length hereinafter.

We have found that the foregoing objects are accomplished when we cause dilute nitric acid and p-xylene, p-cymene, or like p-dialkylbenzene to react at an elevated temperature, for example between 150° C. and 250° C., and under pressure, and after a sufficient reaction time separate the terephthalic acid from the residual acid liquid.

The following examples will serve as specific embodiments of the process in accordance with the invention, but it will be understood that these are by way of illustration only and are not limiting in any way.

EXAMPLE 1 p-Xylene in the amount of 30 pounds was introduced into a pressure-resistant reaction vessel containing 30 pounds of 30% nitric acid (acid from a preceding run butted up to 30% concentration), and 180 pounds of 28.7% nitric acid was fed in over a period of 20 minutes. The weight ratio of 100% nitric acid to p-xylene was thus 2.0/1. The reaction mixture was allowed to rise to a temperature of 221° C. and was held there for 30 minutes, the maximum pressure reached being about 500 pounds per square inch. The reaction mixture, consisting of a slurry of terephthalic acid in waste acid, was cooled, and the oxidation product was separated. Crude terephthalic acid was obtained in the amount of 41.6 pounds, a yield of 88% of material which contained less than 1% p-toluic acid.

EXAMPLE 2

Nitric acid of 30% strength and in the amount of 1 pound was fed into a reactor, followed by 0.441 pound of p-cymene. The mixture was heated to 166° C., after which additional 30% nitric acid was fed in sufficiently to bring the total amount of acid to 8.12 pounds, the addition of acid taking place over a period of 4 minutes. This gave a net nitric acid ratio of 6.0 on a weight basis. The reaction mixture was allowed to rise to a temperature of 180° C. and was held there for 30 minutes, the pressure being maintained at approximately 200 pounds per square inch. The reaction mixture was then cooled to about 38° C. and the oxidation product was separated. Crude terephthalic acid was obtained in the amount of 0.441 pound, a yield of 80.7% if this is all considered as terephthalic acid. Actually this material was of 92.9% purity, p-toluic acid being present as the chief impurity.

EXAMPLE 3

A charge of 1200 pounds of 95% p-xylene was introduced into an autoclave containing 90 pounds of 40% nitric acid. The mixture was heated by admitting steam into heating coils until the temperature reached 157° C. and the pressure reached 88 pounds per square inch (gage), this heating requiring 9 minutes. A total of 7010 pounds of 40% nitric acid was then fed in over a period of 82 minutes. The weight ratio of net nitric acid to p-xylene was 2.37. During the feed period, the temperature rose to 220° C. and the pressure rose to a maximum of 400 pounds per square inch. The reaction mixture was cooled and the oxidation product was separated. The average amount of crude terephthalic acid obtained from a number of runs carried out under the conditions of this example over a period of time was 1503 pounds per run, a yield of 80% of material which contained about 96% of terephthalic acid, the remainder of the products being derived chiefly from impurities in the p-xylene.

The accompanying drawing shows an apparatus assembly suitable for the process. The autoclave 1 is provided with an agitator 2, supported on a shaft passing through the cover 3. The lower part of the autoclave is provided with coils 4, adapted to be filled with steam or cold water for heating or cooling the reactants, as necessary. An outlet 5 closed by valve 6 allows the removal of the contents of the autoclave. The outlet 15 at the upper part of the reactor leads to condenser 8, while an inlet 9 allows introduction of one of the reactants, the other being introduced at 10. In operating the process, the p-xylene is first charged through inlet 9, while nitric acid is pumped in at 10, the liquid contents reaching the level 11. The xylene is brought to the desired initial temperature by means of coils 4, filled with steam, the temperature being indicated by thermocouple 13. At the conclusion of the reaction, the autoclave is cooled by the use of cooling water in the coils. The condensible liquids flow back into the autoclave through pipe 7 during the reaction, while normally gaseous materials, including nitrogen oxides, nitrogen, carbon dioxide, etc., pass out through outlet 12, the autoclave pressure being controlled by valve 14, for subsequent recovery, if desired.

In carrying out the process, p-xylene of as high a purity as practicable will be used, but it will almost invariably include some o- and m-isomers as impurities. The presence of these isomers in relatively small amounts presents no difficulties, however, as their oxidation products can be separated from the terephthalic acid by subsequent treatment. In the examples, nitric acid of about 28-40% strength was used and these are satisfactory concentrations. While the strength can be varied over a considerable range, we find it desirable to employ an initial concentration between 5% and 60% $HNO_3$. Our preferred nitric acid ratio is around 2.4 of 100% nitric to 1 of xylene, but considerable variation of this ratio is possible between 1 and 10, without particularly adverse effect on the yield.

As for operating conditions, a temperature between 150° C. and 250° C. will be maintained during the course of the reaction. High pressure will be maintained in the autoclave also, as a result of the evolution of gaseous products and the high temperature prevailing. A pressure of around 200 p. s. i. was maintained in Example 2, and 400 p. s. i. in Example 3, and these are satisfactory values.

As has been stated, the predominant solid product obtained under the conditions disclosed is terephthalic acid, contaminated by a smaller amount of p-toluic acid, for example in a ratio of 99/1 at temperatures of about 220° C. to around 90/10 when the reaction temperature is about 180° C. While separation of these products may be effected, such separation is not a part of the present invention. The terephthalic acid and p-toluic acid precipitate out of the acid mother liquor and can readily be filtered therefrom. Desirably this filtration is carried out after cooling to substantially room temperature, but it may take place before cooling, if desired. Substantial separation of terephthalic and p-toluic acid can be effected by boiling with water, acetone, xylene, or other solvent, because of the solubility of the p-toluic acid in these solvents. This or a crystallization method can be used for separation of the contaminant, which can subsequently be oxidized to terephthalic acid. Such separation, however, is unnecessary when a reaction temperature above about 200° C. is used, as will be discussed further.

Several variations of the procedure illustrated in the examples may be followed. In commercial operations, a heel of acid from previous runs will be generally used, obtained by butting residual acid to the desired nitric concentration. The method shown introduces the dialkylbenzene into the autoclave containing a heel of acid or a small proportion of fresh nitric acid, and the major portion of the nitric acid subsequently, and this is our preferred procedure. It is also possible to introduce the p-dialkylbenzene into the autoclave, and then the full amount of nitric acid. We may find it desirable, however, to feed both reactants simultaneously, in either a batch or a continuous process. While the examples have illustrated batch procedure, the process is excellently adapted to continuous operation and this may be the most satisfactory procedure. We may at times find it desirable to introduce air or other oxygen-containing gas along with the nitric acid, as an aid to the oxidation.

As has been indicated in the examples, the terephthalic acid product obtained by the oxidation processes described may contain a minor quantity of p-toluic acid as contaminant. Actually the presence of this latter material entails no loss, as it can be re-introduced into the process, for example with fresh p-xylene or other p-dialkylbenzene, and be oxidized to terephthalic acid by the nitric acid.

The examples have cited the oxidation of p-xylene and p-cymene to terephthalic acid by means of nitric acid. It will be understood, however, that the invention includes also the oxidation by this means of any benzene derivatives containing in the para positions oxidizable aliphatic radicals, for example such p-dialkyl derivatives as p-diisopropylbenzene.

The method disclosed is outstandingly an advance over the procedures of the prior art. By the employment of the elevated temperature and pressure conditions described, a one-step process has been developed which gives excellent conversions and yields in remarkably short times of reaction. Whereas previous methods of oxidizing p-xylene merely to p-toluic acid have required many hours for completion of the reaction, the present process allows the cycle to terephthalic acid to be completed in as little as one hour, thereby greatly increasing plant capacity.

It is true that certain portions of the prior art make mention of "quickening" of reactions of this general type by employing higher temperatures. However, the process of the present invention is not merely a "quickening" of the type thus referred to in the prior art involving a gradual increase in reaction rate with gradual increase in temperature wherein the improved or "quickened" reaction nevertheless must yet consume many hours of reaction time. For a practical industrial process, the reaction time must be a matter of minutes or at most not more than a few hours, and the yield must be nearly equal to the theoretical yield. Prior art in this general field shows temperatures as high as about 105° C., but these are not practical because the reaction time is too long and the yields in any reasonable time are too low. For instance, in the oxidation of p-xylene under prior art conditions, commencing with temperatures of 105° C., increasing the temperature by any reasonable increment (for example by 20° C.) actually does not "quicken" the reaction significantly. Between 105° C. and 125° C. in one hour of reaction time the yield increases only from 0 to 1.1% of terephthalic acid and this yield is still inadequate for any practical use.

By way of contrast as determined in connection with the present invention, the yield unexpectedly begins to climb rapidly at a temperature of 130° C., and at 150° C. the reaction becomes the basis for a practical industrial process. This unique range of conditions was unknown to the prior art and is entirely different from the insignificant "quickening" of the reaction as mentioned in the prior art as occurring at much lower temperatures. By contrast, it is determined under the present invention that a remarkable increase in the rate of reaction for practical purposes takes place, and, insofar as any workable industrial process is concerned, it does not occur gradually at all temperatures with temperature increase, but contrary to expectation occurs only when a well defined temperature is reached, namely, at 130° C. and above. This novel set of conditions for a practical industrial process for making terephthalic acid is the substance of the present invention.

The data of Table I illustrates that the "quickening" of the reaction practically does not occur in a predictable way when the temperature is raised, but that instead a unique reaction threshold for the process occurs at 130° C.; at about 150° C., the conversion to terephthalic acid reaches a point at which commercialization of the process can be considered.

*Table I*

| Temp. | Max. Pressure (lb./sq. in. gage) | Net Nitric Acid Ratio | Nitric Acid Strength | Time, Min. | Percent Yield of Terephthalic Acid from p-xylene |
| --- | --- | --- | --- | --- | --- |
| 105 | 0 | 2.0 | 38 | 60 | 0 |
| 125 | 180 | 2.0 | 38 | 60 | 1.1 |
| 140 | 160 | 2.0 | 38 | 60 | 15.4 |
| 155 | 240 | 2.0 | 38 | 60 | 35.5 |
| 165 | 290 | 2.0 | 38 | 60 | 45.8 |

For many of the anticipated practical uses of terephthalic acid, the purity of the product must be as high as possible. A second unique feature of the inventive process, therefore, is the formation of nearly pure terephthalic acid by conducting the reaction at temperatures above about 200° C. Terephthalic acid of about 90% purity is formed rapidly in good yield at 150–180° C. from p-xylene, p-cymene, and the like. The 10% impurity is known to be chiefly p-toluic acid which has not yet been oxidized to terephthalic acid because the reaction in even very long times does not go to completion at these temperatures. At a temperature of 180° C., however, a second reaction threshold is encountered. Above this temperature, the reaction is capable of going to completion, and, at temperatures of more than 200° C., for practical operation, the product contains very little, if any, p-toluic acid because of the completion of the reaction. This second temperature threshold, which must be exceeded to obtain a completely oxidized product, also was unknown to the prior art, whose general claim for a "quickening" of the reaction by raising the temperature, therefore, could not have anticipated the preferred conditions in the inventive process.

The data of Table II illustrate the effect of elevating the temperature to complete the oxidation to yield a nearly pure terephthalic acid product.

*Table II*

| Temp. | Net Nitric Acid Ratio | Nitric Acid Strength, Percent | Time, Min. | Percent Yield of Crude Terephthalic Acid from p-Xylene | Percent Dicarboxylic Acid in Product |
| --- | --- | --- | --- | --- | --- |
| 177° C | 3.5 | 30 | 88 | 90 | 90 |
| 221° C | 2.1 | 31 | 59 | 89 | 99 |

The upper limit of reaction temperature for p-dialkyl-benzene oxidation is about 250° C. At this temperature the terephthalic acid is not stable in the reaction mixture; therefore the yield is lowered by operating at temperatures higher than about 250° C. Table III illustrates the decomposition of terephthalic acid at elevated temperatures.

*Table III*

| Temp. | Nitric Acid Ratio | Nitric Acid Strength, Percent | Time, Min. | Percent Decomposition of Terephthalic Acid |
| --- | --- | --- | --- | --- |
| 236 | 6.0 | 31 | 5 | 8 |
| 244 | 6.0 | 31 | 5 | 13 |
| 258 | 6.0 | 31 | 5 | 57 |
| 266 | 6.0 | 31 | 5 | 64 |
| 270 | 6.0 | 31 | 5 | 79 |
| 274 | 6.0 | 31 | 5 | 85 |

It is to be borne in mind that even though the process conditions set forth may appear to be broad, they are, nevertheless, conditions that are critical to the successful operation of the process. The bases for the minimum and maximum temperatures have been stated in the foregoing. The process also is workable at the limiting values of acid strength and acid ratio, and the limits of 5 to 60% nitric acid and the 1.0 to 10.0 ratio are critical conditions for the satisfactory industrial process. The data of Table IV indicate that the process is operable in the ranges of acid strength and acid ratio set forth.

*Table IV*

| Temp. | Net Nitric Acid Ratio | Nitric Acid Strength, Percent | Time, Min. | Percent Yield of Terephthalic Acid from p-Xylene |
| --- | --- | --- | --- | --- |
| 245° C | 3.5 | 5 | 92 | 72.3 |
| 180° C | 6.0 | 60 | 33 | 61.8 |
| 230° C | 8.5 | 15 | 6 | 47.3 |
| 180° C | [1] 1.0 | 30 | 60 | 51.2 |

[1] $O_2$ was used in conjunction with the $HNO_3$.

The upper limit of the acid ratio is not fixed, but depends on the preferred level of acid strength which it is desired to maintain throughout a reaction. High acid ratios support a high level of acid strength because only a part of the acid is consumed in the reaction. As the size of the alkyl group increases, a higher acid ratio must be used because more acid is needed to oxidize the alkyl group to the carboxyl. A net nitric acid ratio of 10 is considered the maximum ratio which is convenient for nitric acid oxidation of p-dialkylaromatic hydrocarbons in general.

Certain proposals have been made for a two-step process of this general type involving first, the oxidation of p-xylene to p-toluic acid and then, secondly, the further oxidation to terephthalic acid. The data of Table V establish that such a two-step process in which p-toluic is isolated and then is further oxidized would be impractical from a time standpoint.

| Starting Material | Temp., °C. | Net Nitric Acid Ratio | Nitric Acid Strength, Percent | Time | Product | Percent of p-xylene Reacted | Percent Yield |
|---|---|---|---|---|---|---|---|
| p-xylene | 95–7 | 8.0 | 30 | 8 hr | p-Toluic Acid | 73 | 80 |
| Do | 221 | 2.1 | 30.6 | 59 min | Terephthalic Acid | 89 | 100 |

It is thus seen that in the oxidation of p-xylene to p-toluic acid only about 73% of the p-xylene reacts in 8 hr. under the conditions of the prior art to give a yield of 80%. To obtain the end product desired in accordance with the present invention, the p-xylene reaction must be completed and the p-toluic acid must then be oxidized further to terephthalic acid, reactions which require additional time. The inventive process, by contrast, converts all of the p-xylene to terephthalic acid at a yield of 89% in a single operation which requires only 59 min.

It cannot be truly stated that the conditions of the present process would be arrived at by a logical extension from the prior art along the lines indicated. The following facts from our research on the basic chemistry of p-xylene oxidation to terephthalic acid by means of nitric acid show that the present process is far more than simply a practical adaptation of the prior art.

As has already been shown, the oxidation of p-xylene to terephthalic acid consists of two consecutive reactions, (1) the oxidation of p-xylene to p-toluic acid and (2) the oxidation of p-toluic acid to terephthalic acid. Under the one-step procedure of the present invention in which the reaction is carried out at high temperatures and under pressure, these reactions go on simultaneously; that is, a part of the p-toluic acid is being oxidized to terephthalic acid while p-xylene is being oxidized to p-toluic acid. The yields in each of these reactions may be approximated by comparing the over-all yield from the oxidation of p-xylene to terephthalic acid, with the yield from the oxidation of the intermediate p-toluic acid to terephthalic acid. The yield from the oxidation of p-xylene to terephthalic acid amounts to as much as 89%, and the yield from the oxidation of p-toluic acid to terephthalic acid amounts to as much as 98%. The yield in the oxidation of p-xylene to p-toluic acid therefore cannot exceed about 90% because otherwise higher over-all yields would be obtained in the oxidation of p-xylene to terephthalic acid.

The oxidation of the first methyl group of xylene to form p-toluic acid is very much different from that of the second methyl group (oxidation of p-toluic acid to terephthalic acid) with respect to (a) 88–89% yields of carboxylic acid from the first methyl group, in contrast to 95–98% yields of carboxylic acid from the second methyl group, as discussed above; (b) off-gases consisting principally of $N_2O$, $N_2$, and $CO_2$ from oxidation of the first methyl group, and, by contrast, chiefly of NO and only a little $N_2O$, $N_2$, and $CO_2$ from oxidation of the second methyl group; (c) a critical minimum temperature of about 150° C. for practical oxidation of the first methyl group in contrast to about 200° C. for practical oxidation of the second methyl group. The present process is specifically adapted to accomplish the oxidation of both methyl groups in a single operation to form terephthalic acid from the p-xylene starting material in a brief time.

Specific pressures are critical. The lower limit of pressure necessarily is approximately the vapor pressure of water at the reaction temperatures specified. The upper practical limit of operating pressure is approximately 2.5 times the vapor pressure of water at the reaction temperature. At higher pressures, the partial pressure of water vapor is too low to prevent explosive decomposition which can occur spontaneously under these conditions with reactive components of the system. It is also true (a) that relatively low pressures would result in the venting out of more NO (from which the $HNO_3$ reagent can be regenerated in typical equipment used for nitric acid manufacture by oxidation of ammonia) and (b) that relatively high pressures cause less NO to be evolved because the NO is held in the system long enough to react with $HNO_3$ according to the well-known equilibrium: $NO + 2HNO_3 \rightleftarrows 3NO_2 + H_2O$; the $NO_2$ (and not the $HNO_3$) reacts with the organic materials to form intermediates which break down either to NO or to $N_2O$ and $N_2$. It is advantageous to hold back the NO in the reactor, because less $HNO_3$ is consumed when the nitrogen is stripped completely of oxidizing potential by reduction to $N_2O$ and $N_2$.

On the basis of this information acquired in fundamental nitric acid studies, we now have developed the above-mentioned theory which we believe explains the remarkable and unpredictable efficiency of the process of the present invention. The maintenance of a high autoclave pressure by the evolved gaseous products and by the temperature prevailing is essential and is limited (a) on the low side by the steam pressure at the given temperature and (b) on the high side by the instability of the gaseous products at the given temperature and total pressure.

The chemistry of the oxidation of p-xylene to terephthalic acid may be represented by the following reactions:

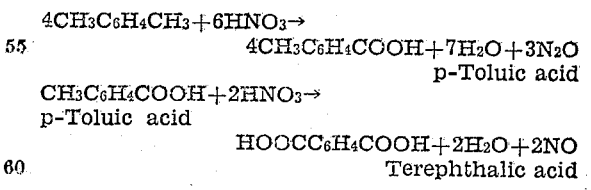

Although the reaction is shown as a stepwise conversion of p-xylene to terephthalic acid, the over-all process takes place in one reactor in a single operation.) The first reaction, in which p-xylene is converted to p-toluic acid, yields mostly $N_2O$ as the off-gas, along with a little $N_2$ and NO. The second reaction, in which p-toluic acid is converted to terephthalic acid, yields mostly NO and only a little $N_2O$ and $N_2$. These equations represent only the major reaction process in these conversions and cannot be used for determining exactly the desired nitric acid ratio.

The oxidation of the first methyl group, therefore, is much different in character from the oxidation of the second methyl group. The difference is also brought out in comparison of (a) the experimentally determined reaction temperature threshold (about 130° C. for the first methyl group of p-xylene, and about 180° C. for the methyl group of p-toluic acid) and (b) the experimentally measured consumption of nitric acid (slightly over 1.0 mole of nitric acid/mole for the first methyl group and about 2.0 moles of nitric acid/mole for the second methyl group). There is a striking difference, therefore, in the oxidation of even the same kind of side-chain group when that group is present on benzenoid rings which contain different substituent groups also. For these reasons, it is evident that it would be impossible to predict the characteristics of the oxidation of various side-chain groups on benzenoid rings.

Terephthalic acid is a chemical compound of considerable importance as an intermediate in the preparation of other organic compounds and compositions, and an efficient method for its manufacture represents a desirable advance.

We have described our process at length in the foregoing, but it will be understood that many variations in details of conditions and procedure may be introduced without departure from the scope of the invention. While very favorable yields have been obtained without the use of catalysts, our process includes also catalytically promoted reactions and a great number of different catalysts may be used, for example mercury and uranium salts.

We intend to be limited, therefore, only by the following claims.

We claim:

1. A purpose for the manufacture of terephthalic acid in a one-step operation, which comprises reacting a p-dialkylbenzene and dilute nitric acid at superatmospheric pressure at a temperature between 150 and 250° C., said acid having an initial strength between 5 and 60%, and being present in a 100% $HNO_3$ ratio by weight between 1 and 10 parts to 1 part of the p-dialkylbenzene the lower limit of said pressure being the vapor pressure of water at the reaction temperature, and the upper limit of said pressure being approximately 2.5 times the vapor pressure of water at the reaction temperature.

2. The process of claim 1, wherein the p-dialkylbenzene is p-xylene.

3. The process of claim 1, wherein the p-dialkylbenzene is p-cymene.

4. The process of claim 1, wherein an oxygen-containing gas is introduced in addition to said nitric acid.

5. The process of claim 1, in which the reaction procedure comprises adding the nitric acid to the p-dialkylbenzene.

LAWTON ARTHUR BURROWS.
ROBERT MORRIS CAVANAUGH.
WESLEY MICHAEL NAGLE.

References Cited in the file of this patent

UNITED STATES PATENTS

| Number | Name | Date |
|---|---|---|
| 1,332,028 | Coblentz et al. | Feb. 24, 1920 |
| 1,488,730 | Beall et al. | Apr. 1, 1924 |
| 1,520,885 | Rankin | Dec. 30, 1924 |
| 1,546,191 | Beall et al. | July 14, 1925 |

FOREIGN PATENTS

| Number | Country | Date |
|---|---|---|
| 216,091 | Germany | Nov. 22, 1909 |

OTHER REFERENCES

De La Rue et al.: Liebigs Ann., vol. 121, pp. 86–93 (1862).

Schwanert: Liebigs Ann., vol. 132, pp. 257–270 (1864).

Dittmar et al.: Liebigs Ann., vol. 162, pp. 337–343 (1872).